US012700936B2

(12) United States Patent
Rengarajan et al.

(10) Patent No.: US 12,700,936 B2
(45) Date of Patent: Aug. 4, 2026

(54) PRIORITY-BASED DESIGNATED INTERFACE SELECTION IN A LINK AGGREGATION GROUP

(71) Applicant: HEWLETT PACKARD ENTERPRISE DEVELOPMENT LP, Spring, TX (US)

(72) Inventors: Madhusudanan Rengarajan, Bangalore (IN); Sethumohan Kumaran, Bangalore (IN); Venkatachalam Swaminathan, Bangalore (IN); Selva Pandi Murugesan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 334 days.

(21) Appl. No.: 18/510,974

(22) Filed: Nov. 16, 2023

(65) Prior Publication Data

US 2025/0096918 A1    Mar. 20, 2025

(30) Foreign Application Priority Data

Sep. 19, 2023    (IN) ............................ 202341062827

(51) Int. Cl.
*H04J 3/06*          (2006.01)
*H04L 45/24*        (2022.01)

(52) U.S. Cl.
CPC .......... *H04J 3/0647* (2013.01); *H04J 3/0673* (2013.01); *H04L 45/245* (2013.01)

(58) Field of Classification Search
CPC ...... H04J 3/0647; H04J 3/0673; H04J 3/0667; H04L 45/245
See application file for complete search history.

(56) References Cited

U.S. PATENT DOCUMENTS

2003/0177154 A1 *   9/2003   Vrancic ..................... G06F 1/12
                                                                      708/160
2005/0232219 A1 *  10/2005   Aiello ............... H04W 56/0015
                                                                      370/336

(Continued)

OTHER PUBLICATIONS

Aruba, AOS-CX 10.10 Fundamentals Guide, 8320, 8325, 8360, 9300, 10000 Switch Series, Feb. 2022 (331 pages).

(Continued)

*Primary Examiner* — Tejis Daya
(74) *Attorney, Agent, or Firm* — Hewlett Packard Enterprise Patent Department

(57) ABSTRACT

In some examples, a first electronic device includes a plurality of interfaces to network links that are part of a link aggregation group. A first time clock selects, from the plurality of interfaces based on priorities associated with the plurality of interfaces, a designated interface to use for a time synchronization process, where the priorities include a first priority assigned to a first interface, a second priority assigned to a second interface, and a third priority assigned to a third interface. The first time clock sends, using the designated interface, a timing message of the time synchronization process to a second electronic device that includes a second time clock to which the first time clock of the first electronic device is to be synchronized according to the time synchronization process.

18 Claims, 5 Drawing Sheets

(56) References Cited

U.S. PATENT DOCUMENTS

| | | | | |
|---|---|---|---|---|
| 2013/0077964 A1* | 3/2013 | Mani | ..................... | H04J 3/0667 |
| | | | | 398/79 |
| 2013/0215889 A1* | 8/2013 | Zheng | .................. | H04J 3/0697 |
| | | | | 370/390 |
| 2015/0124837 A1* | 5/2015 | Saltsidis | .............. | H04L 45/586 |
| | | | | 370/419 |
| 2019/0356403 A1* | 11/2019 | V.K | ......................... | H04L 47/24 |
| 2021/0328697 A1* | 10/2021 | Budnik | ............. | H04L 12/40013 |
| 2023/0092840 A1 | 3/2023 | Budnik et al. | | |
| 2025/0105997 A1 | 3/2025 | Swaminathan et al. | | |

OTHER PUBLICATIONS

Endrun Technologies, Precision Time Protocol (PTP/IEEE-1588) downloaded Aug. 17, 2023 (6 pages).
Garner, Geoffrey M., IEEE 1588 Version 2, Sep. 24, 2008 (89 pages).
Juniper, Junos OS, Time Management Administration Guide, Jun. 16, 2023 (677 pages).
Krzyzanowski, Precision Time Protocol, Feb. 2011 (6 pages).
Geeksforgeeks, "Difference between IEEE 802.3, 802.4 and 802.5", available online at <https://web.archive.org/web/20210512032032/ https://www.geeksforgeeks.org/difference-between-ieee-802-3-802-4-and-802-5/>, Jan. 2, 2020, 5 pages.
John Eidson, IEEE-1588 Standard for a Precision Clock Synchronization Protocol for Networked Measurement and Control Systems, 2005, 94 pages.

* cited by examiner

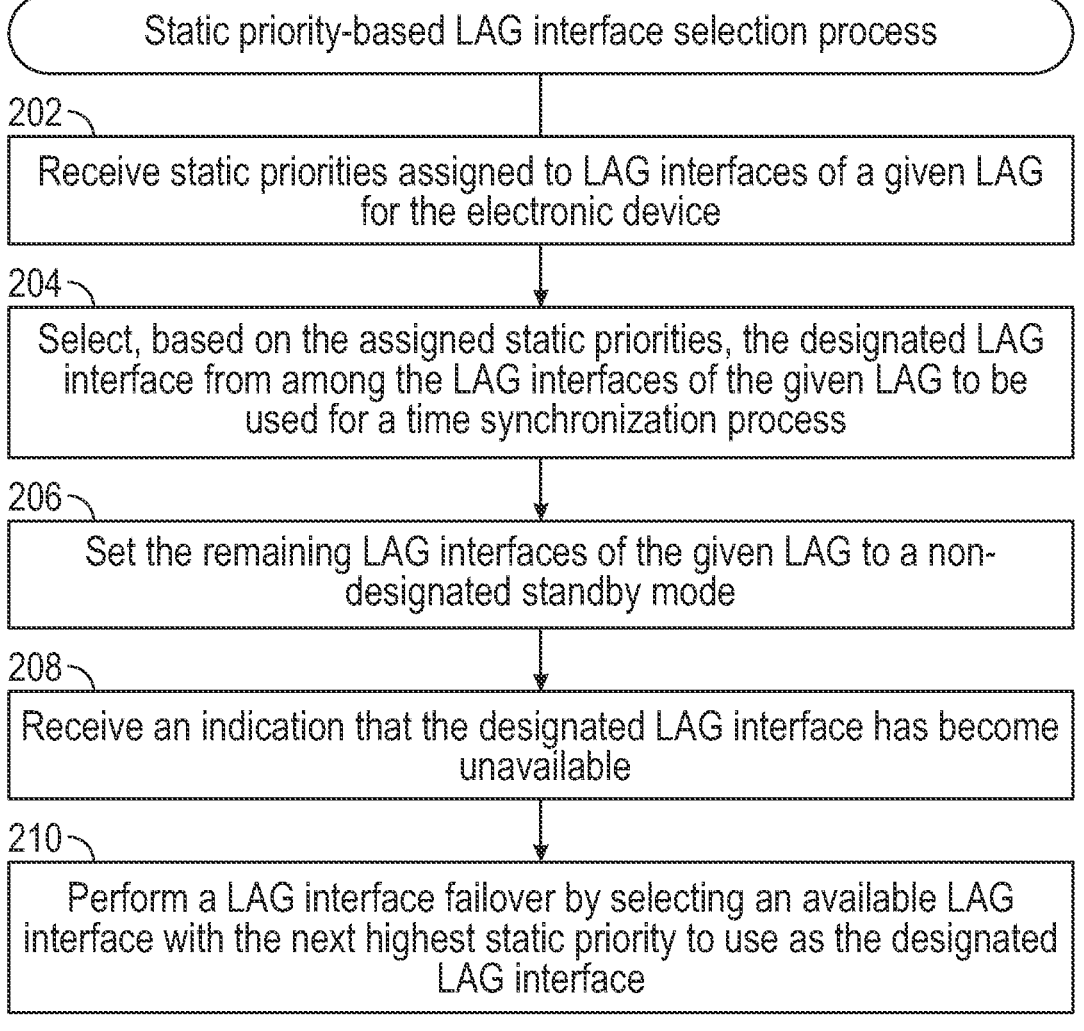

Static priority-based LAG interface selection process

202 —
Receive static priorities assigned to LAG interfaces of a given LAG for the electronic device 204 —
Select, based on the assigned static priorities, the designated LAG interface from among the LAG interfaces of the given LAG to be used for a time synchronization process 206 —
Set the remaining LAG interfaces of the given LAG to a non-designated standby mode 208 —
Receive an indication that the designated LAG interface has become unavailable 210 —
Perform a LAG interface failover by selecting an available LAG interface with the next highest static priority to use as the designated LAG interface

Storage Medium

502

Initial Designated Interface Selection Instructions

504

First Timing Message Sending Instructions

506

Designated Interface Change Instructions

600

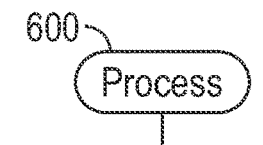

602

Select, by the first time clock from a plurality of LAG interfaces of a first electronic device based on priorities associated with the plurality of LAG interfaces, an initial designated LAG interface to use for a time synchronization process between the first time clock and a second time clock in a second electronic device

604

Send, using the initial designated LAG interface, a first announce message of the time synchronization process from the first time clock to the second time clock

606

Receive, at the first time clock from the second time clock, a second announce message of the time synchronization process

608

Determine, based on the first and second announce messages, whether the first time clock is a clock sink on the initial designated LAG interface Based on a determination that the first time clock is the clock sink on the initial designated LAG interface:

610

Determine, by the first time clock, whether a synchronization message from the second time clock is received at the initial designated LAG interface

612

Based on a determination that the synchronization message from the second time clock is received at a non-designated LAG interface different from the initial designated LAG interface, change, by the first time clock, a designated LAG interface selection by selecting the non-designated LAG interface as a new designated LAG interface

614

Perform, by the first time clock, a remainder of the time synchronization process using the new designated LAG interface

FIG. 6

PRIORITY-BASED DESIGNATED INTERFACE SELECTION IN A LINK AGGREGATION GROUP

BACKGROUND

An electronic device in a distributed system of electronic devices includes a time clock that produces time, which can be wall-clock time or any other representation of time. Times produced by the time clocks in multiple electronic devices allows transactions occurring across the multiple electronic devices to be time-aligned with one another.

BRIEF DESCRIPTION OF THE DRAWINGS

Some implementations of the present disclosure are described with respect to the following figures.

FIG. 2 is a flow diagram of a static priority-based link aggregation (LAG) interface selection process that uses static priorities, according to some examples.

FIG. 6 is a flow diagram of a process according to some examples.

Figure 1:
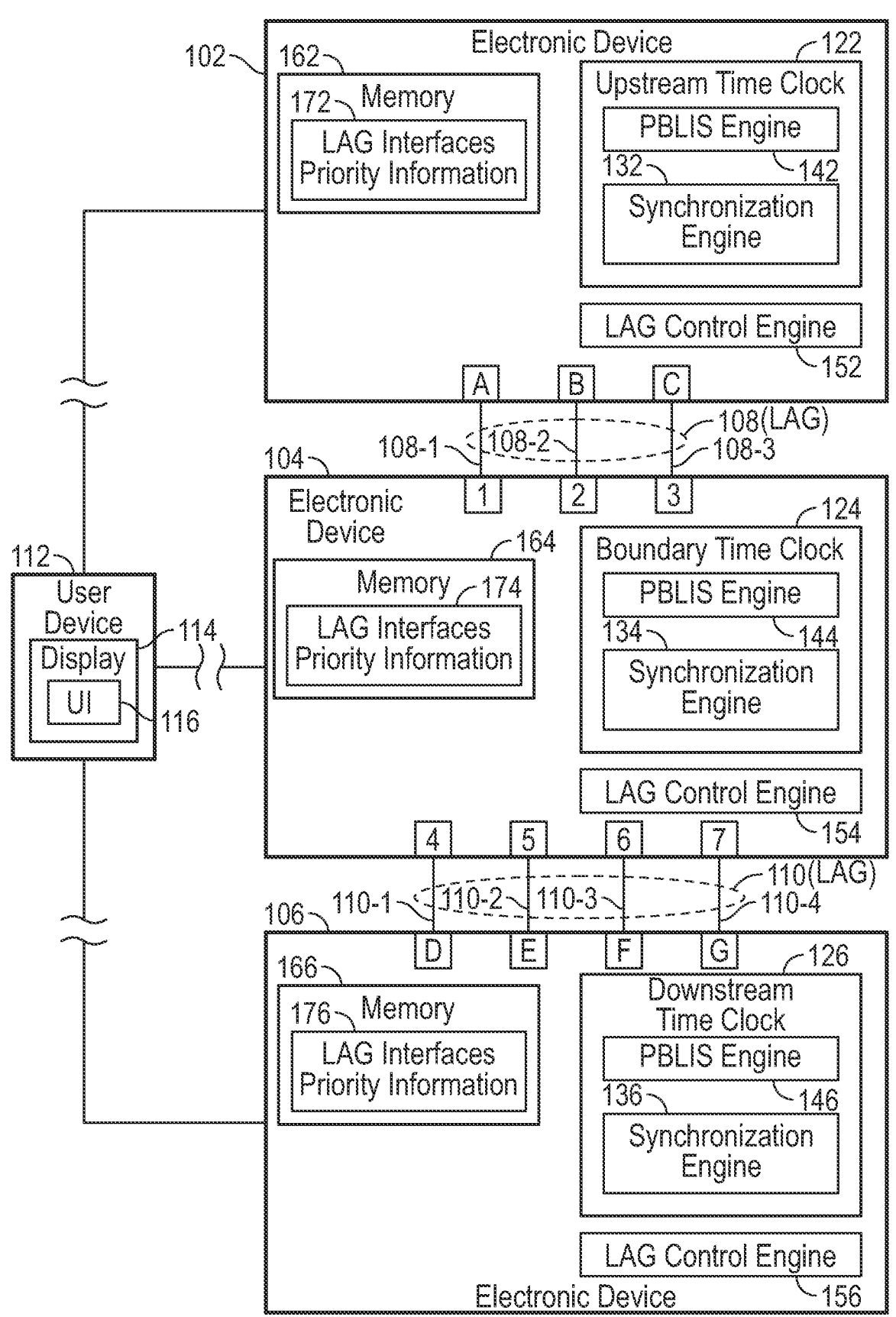
FIG. 1 is a block diagram of an arrangement that includes electronic devices including respective time clocks, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

To maintain synchronization among time clocks (or more simply, "clocks") in electronic devices in a distributed system, a time synchronization process can be employed. In some examples, the time synchronization process can be according to a time synchronization protocol such as the Precision Time Protocol (PTP) described by an Institute of Electrical and Electronics Engineers (IEEE) 1588 Specification.

The distributed system can include a network to interconnect the electronic devices. The network includes physical network links (or more simply "network links") between electronic devices. In some cases, link aggregation can be employed in which multiple network links are aggregated into a logical link (sometimes referred to as a link aggregation group or LAG) between electronic devices. In some examples, link aggregation can be according to an IEEE 802.3ad Specification. Link aggregation allows for packets to be load balanced across the network links of a LAG between two electronic devices. With load balancing, a source electronic device can use different network links of the LAG to send different packets to a target electronic device.

PTP employs timing messages exchanged between electronic devices (or more specifically, between clocks of the electronic devices) to perform time synchronization. If link aggregation is used between the electronic devices, it is possible that the PTP timing messages may traverse different network links in a forward direction and a reverse direction. A first electronic device may send (in a forward direction) a first PTP timing message over a first network link of a LAG to a second electronic device, but the second electronic device may send (in the reverse direction) a second PTP timing message over a different second network link of the LAG to the first electronic device. The use of different network links of the LAG for PTP timing messages between the electronic devices results in asymmetry of communication paths in different directions between the electronic devices, which can impact time offset and other calculations associated with time synchronization since different network links of the LAG may have different link delays. The asymmetry of communication paths used in a time synchronization process results in time synchronization asymmetry that can lead to inaccurate time clock operations.

In some cases, to avoid time synchronization asymmetry, a first network link of the LAG is designated as a primary link for PTP control packets, and a second network link of the LAG is designated as a secondary link for PTP control packets. The remaining network links of the LAG are designated as non-operational, i.e., the remaining network links are not used in communicating information. If the primary link becomes unavailable, then the secondary link can be used for communicating PTP control packets. However, if both the primary and secondary links become unavailable (due to hardware faults or faults of machine-readable instructions), then no other network link of the LAG can be used for PTP time synchronization. As a result, PTP time synchronization would not be possible if both the primary and secondary links became unavailable.

Additionally, during a failover from the primary link to the secondary link responsive to the primary link being unavailable, clock state flap may occur at a boundary time clock. A "boundary time clock" (or more simply, a "boundary clock") refers to a time clock in an electronic device that synchronizes to a clock source that is upstream of the boundary time clock and acts as a clock source to a clock sink downstream of the boundary time clock. According to PTP, the clock source is a master clock, and the clock sink is a slave clock. A time clock can include multiple clock states, including a locked state in which the time clock is phase- and frequency-aligned to a clock source, and a non-locked state in which the time clock is not phase- and frequency-aligned with the clock source and thus a time synchronization process has to be restarted. A "clock state flap" refers to the clock state of a time clock changing from a locked state to a non-locked state. The clock state flap at the boundary time clock can cause clock fluctuations in downstream time clocks of the boundary time clock.

In accordance with some implementations of the present disclosure, a first electronic device includes multiple interfaces (also referred to as "ports") to respective network links of a given LAG. Such interfaces are referred to as "LAG interfaces" (or "LAG ports"). A first time clock in the first electronic device selects, from the multiple LAG interfaces of the given LAG based on priorities associated with the multiple LAG interfaces, a designated LAG interface to use for a time synchronization process, where the priorities are assigned to more than two LAG interfaces of the given LAG. The priorities can include assigned priorities or priorities derived from information associated with the LAG interfaces, such as interface indexes of the LAG interfaces. The first time clock sends, using the designated LAG interface, a timing message of the time synchronization process to a second electronic device that includes a second time clock to which the first time clock of the first electronic device is to be synchronized according to the time synchronization process.

In some examples of the present disclosure, there are two general techniques relating to designated LAG interface selection from among multiple LAG interfaces of a given LAG. A first general technique is a static priority technique in which static priorities are assigned to the multiple LAG interfaces of the given LAG. The static priorities may be assigned by a user (e.g., an administrator or another user) or by a different entity (e.g., a program or a machine). Once the static priorities are assigned, a time clock would perform a selection of a designated LAG interface based on the static priorities for a time synchronization process. If a LAG interface with the highest static priority is available, then the time clock would select the LAG interface with the highest static priority. If the LAG interface with the highest static priority is not available (e.g., the interface is down or faulty), then the time clock would select the LAG interface with the next highest static priority. Note that although the assigned priorities are static in any given round of LAG interface selection for a time synchronization process, the assigned priorities may be changed by a user or another entity and the changed assigned priorities (new static priorities) would be used by a time clock in a subsequent round of LAG interface selection for a time synchronization process.

A second general technique is a dynamic priority technique in which a time clock derives initial priorities for LAG interfaces of the given LAG based on information associated with the LAG interfaces. For example, the information associated with the LAG interface can include interface indexes of the LAG interfaces. An "interface index" refers to a number or string that distinguishes one LAG interface from another LAG interface in a given electronic device. If the interface index is a number, then the interface index can be incremented for each LAG interface according to an order of the LAG interfaces (e.g., an interface index of 1 assigned to a first LAG interface, an interface index of 2 assigned to a second LAG interface, and so forth). With the dynamic priority technique, the time clock can deviate from the initial priorities determined for the LAG interfaces. For example, the time clock can dynamically change the priority of any given LAG interface based on an event associated with the given LAG interface. The event may include the receipt of a particular timing message on the given LAG interface, for example. The dynamic adjustment of the priority of a LAG interface from the initial priority of the LAG interface is explained further below.

In some examples, the PTP (Precision Time Protocol) can be used to exchange timing messages for synchronizing time clocks of electronic devices, such as electronic devices connected to packet-based networks. The time clocks of the electronic devices can be of different precision and stability. In a local area network (LAN), PTP may achieve clock accuracy in the sub-microsecond range.

Examples of electronic devices with time clocks include any or some combination of the following: network devices (e.g., switches, routers, gateways, etc.), computers (e.g., desktop computers, notebook computers, tablet computers, server computers, etc.), smartphones, vehicles, game appliances, storage systems, Internet-of-Things (IoT) devices, or any other types of electronic devices.

A "time clock" in an electronic device refers to hardware circuitry (or a combination of hardware circuitry and machine-readable instructions) that generates a current time.

The time clock is capable of performing a time synchronization process (such as according to the PTP) with other time clocks.

FIG. 1 is a block diagram of an example arrangement that includes electronic devices 102, 104, and 106. Although just three electronic devices are depicted in FIG. 1, in other examples, there may be a different quantity of electronic devices (two or more). The electronic devices 102, 104, and 106 are coupled to a network. In some examples, the electronic devices 102, 104, and 106 are network devices, such as switches or routers, that are able to forward packets along network paths of the network. In other examples, the electronic devices 102, 104, and 106 may include different types of electronic devices.

The electronic device 104 is connected between the electronic device 102 and the electronic device 106. For example, if the electronic device 104 is a network device, then the network device may receive packets from the electronic device 102 and forward the packets to other electronic devices, including the electronic device 106. The electronic devices 102 and 106 may also be network devices that are able to forward packets.

The electronic devices 102 and 104 are connected to one other over network links 108-1, 108-2, and 108-3 of a LAG 108. The electronic devices 104 and 106 are connected to one another over network links 110-1, 110-2, 110-3, and 110-4 of a LAG 110. Although specific quantities of network links are depicted for the LAGs 108 and 110, in other examples, a LAG can include a different quantity of network links.

A "network link" can refer to a communication channel, which can be a wired channel or wireless channel, formed of communication resources (e.g., frequency bands, time slots, coded channels, etc.) over which information can be carried.

The electronic device 102 includes interfaces A, B, and C connected to respective network links 108-1, 108-2, and 108-3 of the LAG 108. Similarly, the electronic device 104 includes interfaces 1, 2, and 3 connected to respective network links 108-1, 108-2, and 108-3 of the LAG 108. An interface that is connected to a network link of a LAG is referred to as a "LAG interface." An "interface" can refer to circuitry (or a combination of circuitry and machine-readable instructions) of an electronic device to communicate over a network link. The circuitry can include a transceiver to transmit and receive signals, and any network protocol layers that manage the exchange of messages according to one or more respective communication protocols.

The electronic device 104 further includes interfaces 4, 5, 6, and 7 connected to respective network links 110-1, 110-2, 110-3, and 110-4 of the LAG 110. Similarly, the electronic device 106 includes interfaces D, E, F, and G connected to respective network links 110-1, 110-2, 110-3, and 110-4 of the LAG 110.

Note that any of the electronic devices 102, 104, and 106 can have additional interfaces (not shown) that can be connected to other network links, whether or not part of a LAG.

Use of a LAG provides for load balancing and redundancy. In some examples, an electronic device can use a Link Aggregation Control Protocol (LACP) that defines messages used for performing link aggregation. The LACP is defined by the IEEE 802.3ad Specification. As shown in FIG. 1, an electronic device includes a LAG control engine that establishes and controls LAGs employed by the electronic device, such as according to the LACP or any other protocol, whether standardized, open source, or proprietary. The electronic device 102 includes a LAG control engine

152, the electronic device 104 includes a LAG control engine 154, and the electronic device 106 includes a LAG control engine 156.

A LAG control engine can use a LAG hash algorithm on packet header content to select which LAG interface of a LAG to transmit a packet. A "packet" can refer to a data packet that carries data or a control packet that carries control information. A packet includes a header and a payload. The payload carries data or control information, while the header includes fields used for forwarding of the packet in a network and for identifying information of one or more communication protocols associated with the packet.

Different electronic devices can run their respective LAG hash algorithms independently of one another, without coordination. A LAG hash algorithm involves the application of a hash function on certain fields of the header of a packet to derive a hash value, and the hash value is used to select from multiple LAG interfaces of a LAG. A LAG control engine in a first electronic device can apply a LAG hash algorithm to select a first LAG interface to send packets to a second electronic device, while a LAG control engine of the second electronic device can apply a LAG hash algorithm to select a second LAG interface (different from the first LAG interface) to send packets to the first electronic device.

Due to the application of independent hashing algorithms in different electronic devices that are connected by a LAG to one other, timing messages of a time synchronization process may be transmitted over different network links of a LAG between electronic devices, which results in time synchronization asymmetry as discussed above. Time synchronization processes are performed among time clocks in the electronic devices.

The electronic device 102 includes a time clock 122, the electronic device 104 includes a time clock 124, and the electronic device 106 includes a time clock 126. The time clock 124 is a boundary time clock (hereinafter referred to as the "boundary time clock 124") with respect to the time clocks 122 and 126. The time clock 122 is upstream of the boundary time clock 124, and is referred to as the "upstream time clock 122." The time clock 126 is downstream of the boundary time clock 124, and is referred to as the "downstream time clock 126."

An "upstream time clock" refers to a time clock that is a clock source (that provides a time reference) for a time clock of another electronic device. A "downstream time clock" refers to a time clock that is a clock sink that uses a time clock of another electronic device as a reference. The boundary time clock 124 is a clock sink of the upstream time clock 122. Additionally, the boundary time clock 124 is a clock source for the downstream time clock 126. Note that either or both of the upstream time clock 122 and the downstream time clock 126 can be a boundary time clock with respect to other time clocks in other electronic devices.

A time clock that is not connected to any downstream time clock is referred to as an "ordinary time clock." Another type of time clock is a transparent time clock, which is an intermediate time clock that can calculate time delays but the transparent time clock does not synchronize to other time clocks.

A time clock includes a synchronization engine used for participating in a time synchronization process between the time clock and a peer time clock. As used here, an "engine" can refer to hardware processing circuitry, which can include any or some combination of a microprocessor, a core of a multi-core microprocessor, a microcontroller, a programmable integrated circuit, a programmable gate array, or another hardware processing circuit. Alternatively, an "engine" can refer to a combination of hardware processing circuitry and machine-readable instructions (software and/or firmware) executable on hardware processing circuitry.

The upstream time clock 122 includes a synchronization engine 132, the boundary time clock 124 includes a synchronization engine 134, and the downstream time clock 126 includes a synchronization engine 136. The synchronization engines 132, 134, and 136 are able to perform time synchronization processes, such as PTP processes or processes according to other time synchronization protocols, whether standardized, open source, or proprietary.

A synchronization engine in a time clock can initiate a time synchronization process, which can be a PTP synchronization process according to some examples, in response to a triggering event. The triggering event can be a periodic event that causes the time synchronization process to be performed periodically by a time clock. Alternatively, the triggering event can be based on other conditions, e.g., any condition indicating that times of different time clocks are not aligned, an electronic device is restarted, or any other condition.

In accordance with some examples of the present disclosure, a time clock can also include a priority-based LAG interface selection engine that selects a designated LAG interface from among multiple LAG interfaces of a LAG based on priorities (static or dynamic priorities) assigned to the LAG interfaces. A "designated LAG interface" refers to an interface of an electronic device used for sending timing messages of a time synchronization process, such as PTP timing messages.

The upstream time clock 122 can include a priority-based LAG interface selection engine 142 (depicted as a "PBLIS" engine in FIG. 1), the boundary time clock 124 can include a priority-based LAG interface selection engine 144, and the downstream time clock 126 can include a priority-based LAG interface selection engine 146. In further examples, a priority-based LAG interface selection engine may not be present in a time clock, such as the upstream time clock 122 if dynamic priorities are used (discussed further below).

In examples in which static priorities are used, the assignment of static priorities to respective LAG interfaces of each electronic device can be performed by a user at a user device 112 that is coupled to the electronic devices 102, 104, and 106 over a network, such as a management network or another type of network. The user device 112 can include a desktop computer, a notebook computer, a tablet computer, a smartphone, or any other type of electronic device. The user device 112 includes a display 114 in which a user interface (UI) 116 can be presented. The UI 116 is a remote command interface that includes control elements that are activatable by the user to set static priorities for the LAG interfaces of any of the electronic devices 102, 104, and 106.

In other examples, a different entity (a program or a machine) can assign static priorities to LAG interfaces of an electronic device. Note that after static priorities have been assigned (by the user or another entity), the user or other entity can change the static priorities at a later time.

An electronic device includes a memory to store priority information for LAG interfaces (referred to as "LAG interfaces priority information"). The LAG interfaces priority information 172, 174, or 176 can include static priorities or dynamic priorities assigned to respective LAG interfaces. The electronic device 102 includes a memory 162 that stores LAG interfaces priority information 172 for the LAG interfaces of the electronic device 102; the electronic device 104 includes a memory 164 that stores LAG interfaces priority information 174 for the LAG interfaces of the electronic device 104; and the electronic device 106 includes a memory 166 that stores LAG interfaces priority information 176 for the LAG interfaces of the electronic device 106. A memory can be implemented using one or more memory devices, such as a dynamic random access memory (DRAM) device, a static random access memory (SRAM) device, a flash memory device, or another type of memory device.

The following discusses some examples of timing messages, such as PTP timing messages. Timing messages can include an announce message, a synchronization message, a follow-up message, a delay-request message, and a delay-response message (as examples).

An announce message contains quality attributes regarding a time clock that sent the announce message. For example, the quality attributes include a class, a priority, and/or a quality of the time clock. Announce messages exchanged between a first time clock and a second time clock can be used by a synchronization engines in the first and second time clocks to determine (based on a comparison of the quality attributes) which of the first and second time clocks is the clock source and which of the first and second time clocks is the clock sink.

A synchronization message (e.g., a PTP Sync message) is sent by a clock source to a clock sink to initiate a time synchronization process. The clock source can record an egress time (T1), which is the time at which the synchronization message was sent. If the clock source is a one-step clock, then T1 can be carried in the synchronization message. If the clock source is a two-step clock, then T1 is carried in a follow-up message (PTP Follow-Up message) sent after the synchronization message. Upon receiving the synchronization message, the clock sink records an ingress time (T2) at which the clock sink received the synchronization message. The clock sink also records the egress time (T1) from the clock source, where T1 may be included in the synchronization message or the follow-up message.

The clock sink sends a delay-request message (e.g., PTP DelayReq message) to the clock source. The clock sink can record an egress time (T3) at which the delay-request message was sent from the clock sink. The clock source receives the delay-request message and records an ingress time (T4) at which the delay-request message was received at the clock source. The clock source then sends a delay-response message (e.g., PTP DelayResp) message to the clock sink. The delay-response message contains the ingress time (T4) of the delay-request message.

Using T1, T2, T3, and T4, the clock sink is able to determine an offset of the clock sink relative to the clock source, such as using computations according to the PTP.

The time clocks 122, 124, and 126 may be one-step or two-step time clocks. Moreover, a boundary clock (e.g., 124 or any other boundary clock) may implement either an end-to-end or peer-to-peer delay mechanism for computing path delays, time offsets, resident times, etc., as described in IEEE 1588. Techniques or mechanisms according to some implementations of the present disclosure can be employed with either one-step clocks or two-step clocks and with either an end-to-end delay mechanism or a peer-to-peer delay mechanism.

Static Priority-Based Lag Interface Selection

In some examples, a priority-based LAG interface selection engine can implement a static priority-based LAG interface selection process, in which a designated LAG interface is selected from multiple LAG interfaces of a LAG based on static priorities assigned to respective LAG interfaces of electronic devices.

FIG. 2 is a flow diagram of a static priority-based LAG interface selection process performed in the electronic device 104. Note that a similar static priority-based LAG interface selection process can be performed in the electronic device 102 or 106.

The priority-based LAG interface selection engine 144 in the boundary time clock 124 of the electronic device 104 receives (at 202) static priorities assigned to LAG interfaces of a given LAG (e.g., 108 or 110) for the electronic device 104. The static priorities may be assigned by a user at the user device 112 (FIG. 1), for example. In such examples, the user device 112 can obtain, from the LAG control engine 154, information of the LAG interfaces of the given LAG. The LAG interfaces can be presented in the UI 116 of the user device 112, and a user can assign static priorities to the presented LAG interfaces. For example, the user can enter static priority values into fields associated with respective LAG interfaces presented in the UI 116. Different static priority values represent different static priorities.

The assigned static priorities are transmitted by the user device 112 to the electronic device 104. In other examples, a different entity can assign static priorities to LAG interfaces and send the assigned static priorities to the electronic device 104. Upon receipt of the assigned static priorities, the priority-based LAG interface selection engine 144 in the electronic device 104 can save the assigned static priorities as part of the LAG interfaces priority information 174 stored in the memory 164 in the electronic device 104. The saved static priorities can be retrieved for use in selecting a designated LAG interface.

The priority-based LAG interface selection engine 144 selects (at 204), based on the assigned static priorities, the designated LAG interface from among the LAG interfaces of the given LAG to be used for a time synchronization process. The selection of the designated LAG interface is based on a comparison, by the priority-based LAG interface selection engine 144, of the static priorities assigned to the LAG interfaces. The priority-based LAG interface selection engine 144 selects an available LAG interface with the highest static priority as the designated LAG interface. The assigned priorities can be represented using different static priority values. In some cases, a lower static priority value indicates a higher priority relative to a higher priority value. In other examples, a higher priority value indicates a higher priority relative to a lower higher priority value.

Note that a LAG interface of an electronic device may not be available for some reason. For example, the LAG interface may be down (e.g., due to a hardware or software fault) or may otherwise be indicated as not available for use. If the LAG interface with the highest static priority is not available, then the priority-based LAG interface selection engine 144 selects an available LAG interface with the next highest static priority.

Once the designated LAG interface has been selected, the priority-based LAG interface selection engine 144 sets (at 206) the remaining LAG interfaces of the given LAG to a non-designated standby mode. The "remaining" LAG interfaces are the LAG interfaces of the given LAG other than the designated LAG interface. In the non-designated standby mode, a LAG interface can receive a timing message of a time synchronization process, but the LAG interface cannot transmit a timing message.

After a selection of a designated LAG interface, the priority-based LAG interface selection engine 144 may receive (at 208) an indication that the designated LAG interface has become unavailable, such as due to such as due to a fault or for any other reason. The indication can include state information of the designated LAG interface. The state information can indicate whether a LAG interface is operational or unavailable.

In response to the indication that the designated LAG interface is has become unavailable, the priority-based LAG interface selection engine 144 performs (at 210) a LAG interface failover by selecting an available LAG interface with the next highest static priority to use as the designated LAG interface.

Note that it is possible that a priority-based LAG interface selection engine may receive an incoming timing message (e.g., a follow-up message or a delay-response message) from a peer time clock at a LAG interface (in the non-designated standby mode) that is not the designated LAG interface. In such cases, the priority-based LAG interface selection engine can remap the incoming timing message (received at a non-designated LAG interface) to the designated LAG interface so that any response to the incoming timing message is sent over the designated LAG interface.

The assignment of static priorities to LAG interfaces allows a user (or another entity) to control which the multiple LAG interface of a given LAG to use as a designated LAG interface for a time synchronization process, which provides predictability. Moreover, in accordance with some examples of the present disclosure, more than two LAG interfaces of the given LAG can be employed for performing time synchronization processes. Thus, even if two LAG interfaces of the given LAG become unavailable, the remaining LAG interface(s) of the LAG can be selected for use as the designated LAG interface.

As noted above, the user or another entity can modify the static priorities at a later time. If a priority-based LAG interface selection engine receives an indication that the static priorities have been changed, the process of FIG. 2 can be re-iterated with the changed static priorities.

Dynamic Priority-Based Lag Interface Selection

In alternative examples, a dynamic priority-based LAG interface selection process can be employed, rather than the static priority-based LAG interface selection process discussed above. With the dynamic priority-based LAG interface selection process, a user or another entity does not have to pre-assign static priorities to LAG interfaces. The assignment of static priorities to LAG interfaces may be associated with overhead (in terms of time spent or processing resources used) since the user or another entity may have to keep track of which LAG interfaces of peer electronic devices are connected together so that the user or another entity can assign consistent static priorities to the LAG interfaces in the peer electronic devices. Any misconfiguration or incorrect mapping of LAG interfaces of peer electronic devices can lead to in time synchronization asymmetry and inaccuracies in calculated time offsets between a clock source and a clock sink.

With the dynamic priority-based LAG selection process, a priority-based LAG interface selection engine can assign initial priorities to LAG interfaces of a given LAG based on information associated with the LAG interfaces. The information associated with LAG interfaces can include interface indexes of the LAG interfaces. The initial priorities are subject to dynamic modification, based on exchanged timing messages in a time synchronization process.

Figure 3:
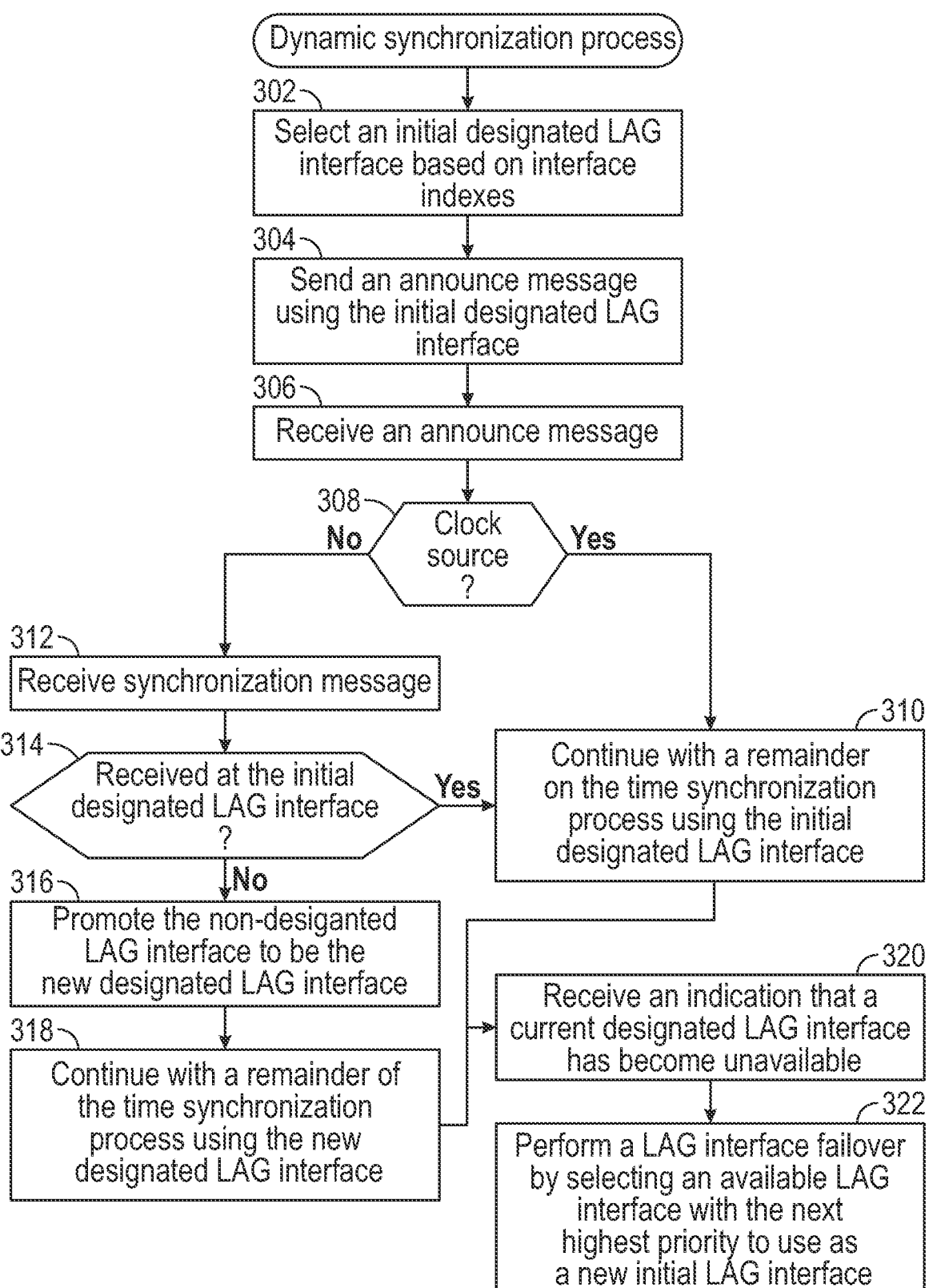
FIG. 3 is a flow diagram of a dynamic synchronization process that uses a dynamic priority-based LAG interface selection process, according to further examples.

FIG. 3 is a flow diagram of a dynamic synchronization process that employs dynamic priority-based LAG selection process according to some examples. The synchronization process of FIG. 3 can be performed by the boundary time clock 124 in the electronic device 104. Another time clock in another electronic device can perform a similar synchronization process.

In examples in which the dynamic priority-based LAG selection process is employed, a clock source (e.g., the upstream time clock 122 of FIG. 1) does not have to support dynamic priority-based LAG selection. Rather, the clock source can simply employ a LAG hash algorithm (such as according to the PTP) to select a LAG interface over which a timing message is to be sent. The priority-based LAG interface selection engine can apply the dynamic priority-based LAG selection process to modify which LAG interface is selected as the designated LAG interface based on which LAG interface a timing message such as a synchronization message (e.g., PTP Sync) was received at.

In other examples, both the clock source and the clock sink can employ the dynamic priority-based LAG selection process according to some implementations of the present disclosure.

Initially, the priority-based LAG interface selection engine 144 in the boundary time clock 124 selects (at 302) a designated LAG interface from among the LAG interfaces of a given LAG based on interface indexes of the LAG interfaces. The designated LAG interface selected based on interface indexes is referred to as an "initial designated LAG interface." In some examples, the interface indexes indicate initial priorities that are associated with the LAG interfaces. For example, a LAG interface with a lower (or higher) interface index has a higher priority relative to a LAG interface with a higher (or lower) interface index. The priority-based LAG interface selection engine 144 compares the interface indexes of the LAG interfaces of the given LAG, and the priority-based LAG interface selection engine 144 selects an available LAG interface with the lowest (or highest) interface index as the initial designated LAG interface. The remaining LAG interfaces of the given LAG are set in a non-designated standby mode.

In other examples, other information associated with LAG interfaces of the given LAG can be used to indicate relative priorities of the LAG interfaces. For example, the priority-based LAG interface selection engine 144 can generate random numbers (e.g., from a pseudo-random generator) or other values to assign the LAG interfaces, and the priority-based LAG interface selection engine 144 can derive relative priorities of the LAG interfaces based on the random numbers or other values.

The synchronization engine 134 in the boundary time clock 124 can send (at 304) a timing message using the initial designated LAG interface. The timing message sent may include an announce message, for example, sent by the boundary time clock 124 to the upstream time clock 122.

The synchronization engine 134 may also receive (at 306) an announce message from the upstream time clock 122. Note that the announce message from the upstream time clock 122 may be received at a non-designated LAG interface (a LAG interface in the non-designated standby mode) of the given LAG. If the announce message from the upstream time clock 122 is received at a non-designated LAG interface, then the synchronization engine 134 can remap the received announce message to the initial designated LAG interface (selected at 302) so that the synchronization engine 134 can compare quality information of the announce messages. Remapping the received announce message from the upstream time clock 122 to the initial designated LAG interface refers to specifying that the received announce message is to be analyzed with respect to an announce message transmitted (or that will be transmitted) by the boundary time clock 124 from the initial designated LAG interface.

Based on comparing the quality attributes of the announce message sent by the boundary time clock 124 and the quality attributes of the announce message received from the upstream time clock 122, the synchronization engine 134 determines (at 308) whether the boundary time clock 124 is the clock source or the clock sink on the initial designated LAG interface. If the boundary time clock 124 is the clock source, then the upstream time clock 122 is the clock sink, but if the boundary time clock 124 is the clock sink, then the upstream time clock 122 is the clock source. Note that the designated LAG interface has a synchronization interface state (e.g., PTP port state) associated with the initial designated LAG interface. The synchronization interface state can be either a clock source state or a clock sink state. Thus, the determination at 308 is a determination of whether the initial designated LAG interface has the clock source state or the clock sink state.

If the synchronization engine 134 determines (at 308) that the initial designated LAG interface has the clock source state, no dynamic modification has to be made with respect to the initial designated LAG interface that is in the clock source state, and tasks 316 and 318 are skipped. The synchronization engine 134 continues (at 310) with a remainder of the time synchronization process. The remainder of the time synchronization process can include exchanges of synchronization, follow-up (if a two-step clock is used), delay-request, and delay-response messages, for example However, if the synchronization engine 134 determines (at 308) that the initial designated LAG interface has the clock sink state, then tasks 312, 314, 316, and 318 are performed. In the ensuing discussion, it is assumed that the synchronization engine 134 determines that the initial designated LAG interface has the clock sink state, which means that the upstream time clock 122 is the clock source on the initial designated LAG interface.

Based on the initial designated LAG interface being in the clock sink state (as determined at 308), a dynamic modification may have to be made with respect to the initial designated LAG interface that is in the clock sink state because it is possible that a synchronization message may be received from the clock source (the upstream time clock 122) at a non-designated LAG interface. Note that the upstream time clock 122 may have selected a different LAG interface as a designated LAG interface at the electronic device 102, such as due to application of a LAG hash algorithm at upstream time clock 122. As a result, time synchronization asymmetry may occur between the upstream time clock 122 and the boundary time clock 124.

To address the time synchronization asymmetry, the priority-based LAG interface selection engine 144 of the boundary time clock 124 is able to update the priorities of the LAG interfaces of the given LAG based on which LAG interface a synchronization message (e.g., PTY Sync) was received at. For example, the priority-based LAG interface selection engine 144 may have selected LAG interface 1 (FIG. 1) as the initial designated LAG interface based on interface indexes of the LAG interfaces 1, 2, and 3 of the electronic device 104.

However, the synchronization engine 132 of the upstream time clock 122 in the electronic device 102 may have selected LAG interface B (which is coupled to LAG interface 2 of the electronic device 104) over the network link 108-2 of the LAG 108 to send the synchronization message, such as based on a LAG hash algorithm. Since the hash function of the LAG hash algorithm is applied on specific fields of the header of synchronization messages from the upstream time clock 122 to the boundary time clock 124, the hash function will produce the same hash value for each of such synchronization messages. As a result, for each synchronization message sent by the upstream time clock 122 to the boundary time clock 124, the upstream time clock 122 would select the same LAG interface based on the hash value (e.g., select LAG interface B).

In light of this predictable behavior relating to the LAG interface used for the synchronization messages, the priority-based LAG interface selection engine 144 of the boundary time clock 124 can modify its initial designated LAG interface selection (e.g., LAG interface 1 in the example given above). The boundary time clock 124 receives (at 312) a synchronization message from the upstream time clock 122. The priority-based LAG interface selection engine 144 determines (at 314) whether the synchronization message is received at the initial designated LAG interface (e.g., LAG interface 1) or at a non-designated LAG interface (different from the initial designated LAG interface).

In response to determining that the synchronization message is received at the initial designated LAG interface (e.g., LAG interface 1), no modification of the initial designated LAG interface is performed by the priority-based LAG interface selection engine 144, and the priority-based LAG interface selection engine 144 can continue to perform (at 310) a remainder of the time synchronization process with the upstream time clock 122 using the initial designated LAG interface. The remainder of the time synchronization process can include exchanges of follow-up (if a two-step clock is used), delay-request, and delay-response messages, for example.

However, in response to determining that the synchronization message is received at a non-designated LAG interface (e.g., LAG interface B), the priority-based LAG interface selection engine 144 promotes (at 316) the non-designated LAG interface (e.g., LAG interface B) to be the new designated LAG interface. The promotion of the non-designated LAG interface to be the new designated LAG interface dynamically changes the priority of the non-designated LAG interface to be higher than the priority of the initial designated LAG interface. The priority-based LAG interface selection engine 144 can continue to perform (at 318) a remainder of the time synchronization process with the upstream time clock 122 using the new designated LAG interface. In this way, time synchronization symmetry can be achieved between the upstream time clock 122 and the boundary time clock 124. The remainder of the time synchronization process can include exchanges of follow-up (if a two-step clock is used), delay-request, and delay-response messages, for example.

At a later time, the priority-based LAG interface selection engine 144 may receive (at 320) an indication that a current designated LAG interface has become unavailable, such as due to such as due to a fault or for any other reason. The "current" designated LAG interface is the initial designated LAG interface if the flow including task 310 is followed, and the "current" designated LAG interface is the new designated LAG interface if the flow including tasks 316 and 318 is followed.

In response to the indication that the current designated LAG interface is has become unavailable, the priority-based LAG interface selection engine 144 performs (at 322) a LAG interface failover by selecting an available LAG interface with the next highest priority (e.g., next highest interface index) to use as a new initial designated LAG interface. This new initial designated LAG interface is subject to modification based on a receipt of a synchronization message from the upstream time clock 122 at a non-designated LAG interface that is different from the new initial designated LAG interface.

In some examples, a dynamic priority-based LAG interface selection process may have the following benefits. Configuration overhead can be reduced since a user or another entity does not have to pre-assign priorities to electronic devices. The dynamic priority-based LAG interface selection process is able to dynamically change priorities of LAG interfaces based on timing message of a timing synchronization process such as a PTP process. The dynamic priority-based LAG interface selection process does not rely on adding additional messages or information elements to support the dynamic adjustment of LAG interface priorities. As a result, some of the electronic devices (such as the electronic device 102 with the upstream time clock 122) does not have to be modified to support the dynamic priority-based LAG interface selection process.

In some examples of the present disclosure, the dynamic priority-based LAG interface selection process is non-preemptive, which means that if a LAG interface with a lower interface index were to become available after a current designated LAG interface has been selected, the current designated LAG interface would not be changed based on the LAG interface with the lower interface index becoming available so long as the current designated LAG interface remains available (i.e., the current designated LAG interface becoming unavailable would trigger a failover process as discussed above).

As noted above, a LAG interface in a non-designated standby mode is capable of receiving timing messages but is unable to transmit timing messages. If a designated LAG interface becomes unavailable, then a non-designated LAG interface can be selected as the next designated LAG interface simply by unblocking the transmission capability of the non-designated LAG interface. As a result, the time synchronization process (e.g., a PTP process) does not have to be restarted when the designated LAG interface is changed. The failover can thus be performed in an efficient and seamless manner without impacting time clock functionality and accuracy.

FURTHER EXAMPLES

Figures 4, 5:
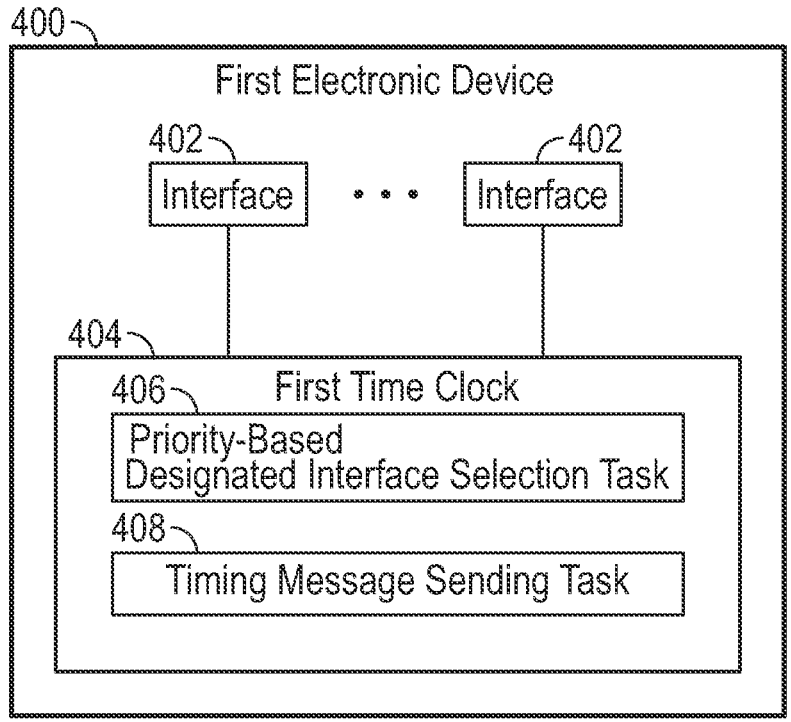
FIG. 4 is a block diagram of an electronic device according to some examples.
FIG. 5 is a block diagram of a storage medium storing machine-readable instructions according to some examples.

FIG. 4 is a block diagram of a first electronic device 400 according to some examples. The first electronic device 400 is an example of any of the electronic devices 102, 104, and 106 of FIG. 1.

The electronic device 400 includes a plurality of interfaces 402 to network links that are part of a LAG. The plurality of interfaces 402 are LAG interfaces.

The electronic device 400 includes a first time clock 404 to provide time information. The first time clock 404 is an example of any of the time clocks 122, 124, and 126 in FIG. 1. The first time clock 404 is to perform various tasks. Such tasks can be performed by hardware processing circuitry of the first time clock 404, or by machine-readable instructions executed by the first time clock 404.

The tasks of the first time clock 404 include a priority-based designated interface selection task 406 to select, from the plurality of interfaces 402 based on priorities associated with the plurality of interfaces 402, a designated interface to use for a time synchronization process. The priorities include a first priority assigned to a first interface, a second priority assigned to a second interface, a third priority assigned to a third interface, and so forth. The priorities can be static priorities or initial priorities (the initial priorities are subject to change).

The tasks of the first time clock 404 include a timing message sending task 408 to send, using the designated interface, a timing message of the time synchronization process to a second electronic device that includes a second time clock to which the first time clock of the first electronic device is to be synchronized according to the time synchronization process.

In examples where the priorities are static priorities, the static priorities can be received from a remote command interface (e.g., the UI 116 of FIG. 1) or from another entity.

In examples where the priorities are initial priorities subject to change, the priorities can be based on interface indexes assigned to the plurality of interfaces 402. For example, a lower (or higher) interface index can indicate a higher priority relative to a higher (or lower) interface index.

In some examples, the timing message includes an announce message (sent from the first time clock 404) containing information to select which of the first time clock 404 and the second time clock is a clock source and which other one of the first time clock 404 and the second time clock is a clock sink. The announce message can include clock quality information, for example, that indicates a quality of the first time clock 404.

In some examples, the first time clock 404 determines, based on the announce message, that the first time clock 404 is the clock sink (and that the second time clock is the clock source). Based on determining that the first time clock 404 is the clock sink, the first time clock 404 detects that a synchronization message for the time synchronization process is received at a second interface of the plurality of interfaces, the second interface being different from the designated interface.

In some examples, based on detecting that the synchronization message is received at the second interface, the first time clock 404 changes a designated interface selection by selecting the second interface as a new designated interface. This change in designated interface selection changes the priorities of the plurality of interfaces 402 to allow the new designated interface to be selected.

In some examples, the first time clock 404 sends, using the new designated interface, a further timing message of the time synchronization process to the second electronic device. The further timing message is a delay message (e.g., a delay-request message) for calculating a delay in a network link between the first and second electronic devices.

In some examples, the plurality of interfaces 402 include the designated interface and remaining interfaces that are non-designated interfaces. The first time clock 404 is able to receive a timing message of the time synchronization process at a non-designated interface.

In some examples, the non-designated interfaces are in a standby mode capable of receiving timing messages of the time synchronization process, but the non-designated interfaces are blocked from transmitting any timing message of the time synchronization process.

In some examples, the first time clock 404 detects that the designated interface has become unavailable, and in response to detecting that the designated interface has become unavailable, selects, based on the priorities assigned the non-designated interfaces, a further interface from among the non-designated interfaces as a new designated interface. The first time clock 404 sends, using the new designated interface, a timing message of the time synchronization process to the second electronic device.

FIG. 5 is a block diagram of a non-transitory machine-readable or computer-readable storage medium 500 storing machine-readable instructions that upon execution cause a first time clock to perform various tasks. The first time clock may be the boundary time clock 124 of FIG. 1, or another boundary time clock.

The machine-readable instructions include initial designated interface selection instructions 502 to select, from a plurality of interfaces based on priorities associated with the plurality of interfaces, an initial designated interface to use for a time synchronization process. The priorities may be based on interface indexes of the plurality of interfaces, for example.

The machine-readable instructions include first timing message sending instructions 504 to send, using the initial designated interface, a first timing message of the time synchronization process to a second time clock to which the first time clock is to be synchronized according to the time synchronization process. The first timing message is an announce message, for example.

The machine-readable instructions include designated interface change instructions 508 to, based on receiving, from the second time clock, a second timing message at a non-designated interface of the first time clock where the non-designated interface is different from the initial designated interface, change a designated interface selection by selecting the non-designated interface as a new designated interface. The second timing message is a synchronization message, for example.

FIG. 6 is a flow diagram of a process 600 according to some examples of the present disclosure. The process 600 can be performed by a first time clock, such as any of the time clocks 122, 124, and 126 in FIG. 1.

The process 600 includes selecting (at 602), by the first time clock from a plurality of LAG interfaces of a first electronic device based on priorities associated with the plurality of LAG interfaces, an initial designated LAG interface to use for a time synchronization process between the first time clock and a second time clock in a second electronic device. The priorities may be based on interface indexes of the plurality of LAG interfaces, for example.

The process 600 includes sending (at 604), using the initial designated LAG interface, a first announce message of the time synchronization process from the first time clock to the second time clock. The process 600 includes receiving (at 606), at the first time clock from the second time clock, a second announce message of the time synchronization process. The first and second announce messages contain clock quality information to enable the first and second time clocks to select a clock source.

The process 600 includes determining (at 608), based on the first and second announce messages, whether the first time clock is a clock sink on the initial designated LAG interface. The first and second announce messages may indicate that the second time clock is the higher quality time clock, and so the second time clock should be used as the clock source to which the first time clock is to synchronize.

The process 600 includes performing tasks 610, 612, and 614 based on a determination that the first time clock is the clock sink on the initial designated LAG interface. In other words, the initial designated LAG interface has the clock sink state.

Task 610 includes determining, by the first time clock, whether a synchronization message from the second time clock is received at the initial designated LAG interface.

Task 612 includes based on a determination that the synchronization message from the second time clock is received at a non-designated LAG interface different from the initial designated LAG interface, changing, by the first time clock, a designated LAG interface selection by selecting the non-designated LAG interface as a new designated LAG interface.

Task 614 includes performing, by the first time clock, a remainder of the time synchronization process using the new designated LAG interface.

A storage medium (e.g., 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first electronic device comprising:
a plurality of interfaces to network links that are part of a link aggregation group; and
a first time clock to provide time information, the first time clock to:
select, from the plurality of interfaces based on priorities associated with the plurality of interfaces, a designated interface to use for a time synchronization process, wherein the priorities comprise a first priority assigned to a first interface, a second priority assigned to a second interface, and a third priority assigned to a third interface; and
send, using the designated interface, a timing message of the time synchronization process to a second electronic device that includes a second time clock to which the first time clock of the first electronic device is to be synchronized according to the time synchronization process, wherein the timing message comprises an announce message containing information to select which of the first time clock and the second time clock is a clock source and which other one of the first time clock and the second time clock is a clock sink.

2. The first electronic device of claim 1, wherein the priorities comprise static priorities.

3. The first electronic device of claim 2, wherein the first electronic device is to receive the static priorities through a remote command interface.

4. The first electronic device of claim 1, wherein the priorities are based on interface indexes assigned to the plurality of interfaces.

5. The first electronic device of claim 1, wherein the first time clock is to:

determine, based on the announce message, that the first time clock is the clock sink;

based on determining that the first time clock is the clock sink, detect that a synchronization message for the time synchronization process is received at a further interface of the plurality of interfaces, the further interface being different from the designated interface.

6. The first electronic device of claim 5, wherein the first time clock is to:

based on detecting that the synchronization message is received at the further interface, change a designated interface selection by selecting the further interface as a new designated interface.

7. The first electronic device of claim 6, wherein the first time clock is to:

send, using the new designated interface, a further timing message of the time synchronization process to the second electronic device.

8. The first electronic device of claim 7, wherein the further timing message is a delay message for calculating a delay in a network link between the first and second electronic devices.

9. The first electronic device of claim 1, wherein the plurality of interfaces comprise the designated interface and remaining interfaces that are non-designated interfaces, and wherein the first time clock is to:

receive a timing message of the time synchronization process at a non-designated interface of the non-designated interfaces.

10. The first electronic device of claim 9, wherein the non-designated interfaces are in a standby mode capable of receiving timing messages of the time synchronization process, but the non-designated interfaces are blocked from transmitting any timing message of the time synchronization process.

11. The first electronic device of claim 9, wherein the first time clock is to:

detect that the designated interface has become unavailable;

in response to detecting that the designated interface has become unavailable, select, based on the priorities assigned the non-designated interfaces, a further interface from among the non-designated interfaces as a new designated interface; and send, using the new designated interface, a timing message of the time synchronization process to the second electronic device.

12. The first electronic device of claim 1, wherein the first electronic device comprises a network switch, and the first time clock is part of the network switch.

13. The first electronic device of claim 1, wherein the first time clock is a boundary time clock.

14. A non-transitory machine-readable storage medium comprising instructions that upon execution cause a first time clock to:

select, from a plurality of interfaces based on priorities associated with the plurality of interfaces, an initial designated interface to use for a time synchronization process;

send, using the initial designated interface, a first timing message of the time synchronization process to a second time clock to which the first time clock is to be synchronized according to the time synchronization process;

based on receiving, from the second time clock, a second timing message at a non-designated interface of the first time clock wherein the non-designated interface is different from the initial designated interface, change a designated interface selection by selecting the non-designated interface as a new designated interface; and determine, based on the first timing message, that the first time clock is a clock sink and the second time clock is a clock source on the initial designated interface, wherein the changing of the designated interface selection is responsive to the determination that the first time clock is the clock sink.

15. The non-transitory machine-readable storage medium of claim 14, wherein the first timing message is an announce message, and the second timing message is a synchronization message.

16. The non-transitory machine-readable storage medium of claim 14, wherein the priorities associated with the plurality of interfaces are based on interface indexes of the plurality of interfaces.

17. A method comprising:

selecting, by a first time clock from a plurality of logical aggregation group (LAG) interfaces of a first electronic device based on priorities associated with the plurality of LAG interfaces, an initial designated LAG interface to use for a time synchronization process between the first time clock and a second time clock in a second electronic device;

sending, using the initial designated LAG interface, a first announce message of the time synchronization process from the first time clock to the second time clock;

receiving, at the first time clock from the second time clock, a second announce message of the time synchronization process;

determining, based on the first and second announce messages, whether the first time clock is a clock sink on the initial designated LAG interface; and based on a determination that the first time clock is the clock sink on the initial designated LAG interface:

determining, by the first time clock, whether a synchronization message from the second time clock is received at the initial designated LAG interface, based on a determination that the synchronization message from the second time clock is received at a non-designated LAG interface different from the initial designated LAG interface, changing, by the first time clock, a designated LAG interface selection by selecting the non-designated LAG interface as a new designated LAG interface, and performing, by the first time clock, a remainder of the time synchronization process using the new designated LAG interface.

18. The method of claim 17, wherein the time synchronization process is a Precision Time Protocol (PTP) process.

\* \* \* \* \*